2,896,282

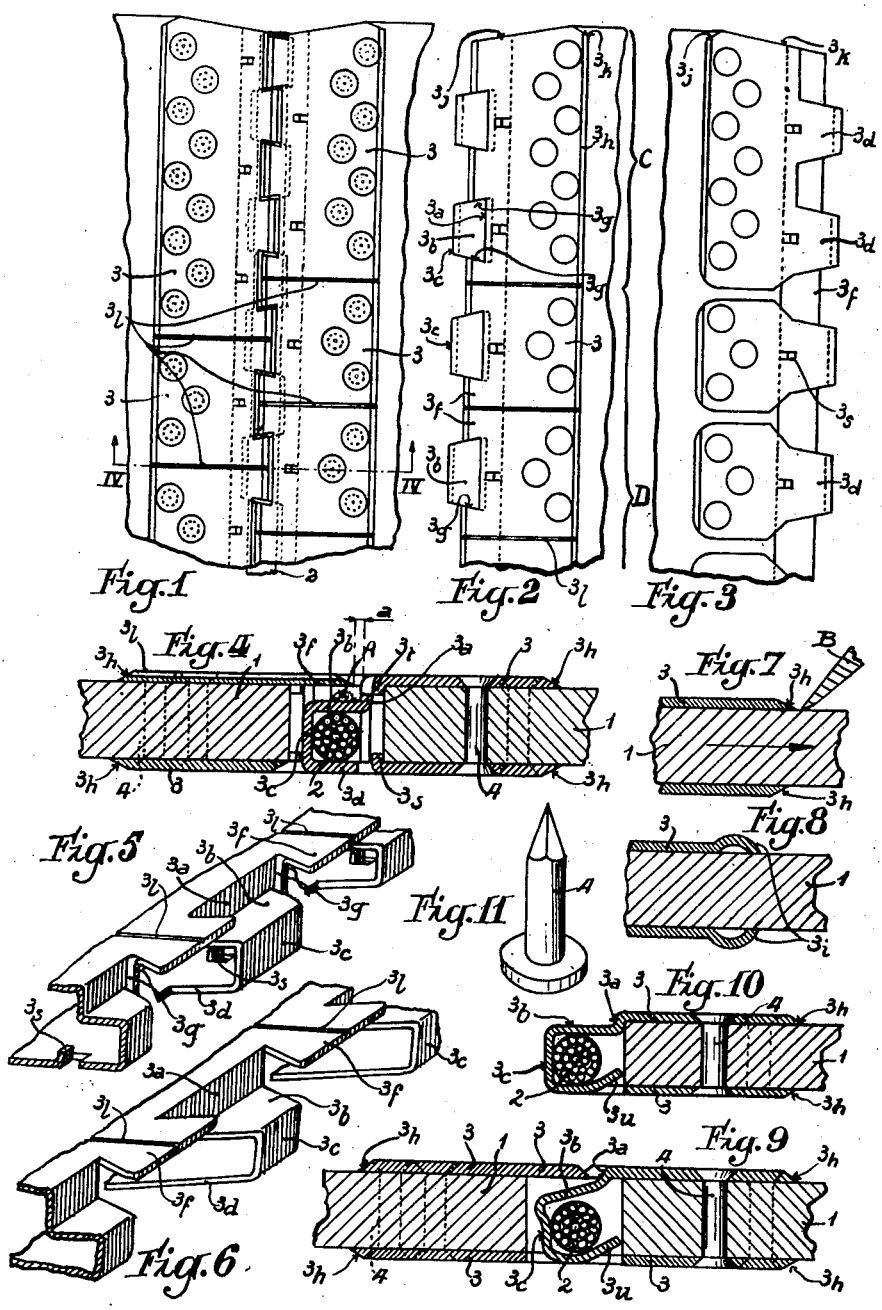

FASTENERS FOR CONVEYOR BELTS AND THE LIKE

Henry Leflon, Tangiers, Morocco

Application October 26, 1954, Serial No. 464,705

Claims priority, application France February 9, 1954

3 Claims. (Cl. 24—33)

My invention relates to fasteners for belts and more particularly for conveyor belts, of the type comprising two U-shaped members adapted to be disposed on the ends of the belt, the bent end of each member being recessed at intervals to provide spaces to accommodate the unrecessed portions of the bent end of the other member, and the two members being hinged together by means of an appropriate hinge pin, generally in the form of a length of steel cable.

It is known that conveyor belts are often curved transversely on their supporting rollers in the form of a trough to retain the material which they have to carry, such as coal or ore, and in order to provide the transverse flexibility required it has been customary to form each member of the hinged fastener of a number of separate elements regularly spaced across the end of the belt. Such an arrangement requires much care in the mounting of the fastener on the belt to properly dispose the successive elements and it is in practice necessary to use a guide to correctly punch the holes adapted to receive the bolts or rivets securing the elements on the belt ends.

Another drawback of the known conveyor belt fasteners is that they are not tight against powdered material such as coal dust, for instance. It would of course be theoretically possible to so devise the two intermeshing hinged members of the fastener that they fit together with an extremely small clearance, but such a fastener made of a plurality of separate elements could not be properly adapted on the belt because the unavoidable errors in the mutual spacing of the elements would be greater than the transverse clearance provided. The provision of a small longitudinal clearance moreover requires that the hinge pin should fit exactly in the transverse space determined by the intermeshing bent ends of the hinged members, and such a pin could hardly be inserted. The hinge pin besides wears out rather rapidly in use and therefore the longitudinal clearance correspondingly increases.

The known conveyor belt fasteners are frequently damaged by shocks against the supporting frame, or against other lateral obstructions. It also sometimes occurs that a solid piece of the material transported is temporarily stopped by a lateral or overhead obstruction and therefore slides on the belt in the portion thereof comprising the fastener which it tends to rip open.

An object of my invention is to provide a hinged belt fastener which will not impair the transverse flexibility of the belt, which will be easily disposed and secured on the belt ends without any particular tool, guide or the like, which will be substantially tight to powdered material, and which will not be liable to become torn in use by shocks and the like.

According to my invention each U-shaped member of a hinged belt fastener is formed of a flexible succession of elements integral with each other on one side of the belt, but spaced from each other on the other side thereof, the end elements being re-inforced with respect to the intermediate ones. The re-inforcement of the end elements may be effected by making them of greater length, or of metal of greater thickness, or by securing them onto the belt by a greater number of rivets, bolts, screws or like means. Another method of re-inforcement consists in reducing the pitch of the succession of recessed and unrecessed parts along the said end elements with respect to the intermediate ones.

The bridge portions connecting each two successive elements on one side of the belt are preferably provided with grooves, holes or similar arrangements adapted to determine a longitudinal line of lesser mechanical strength along which these portions will break in use under the action of repeated bending, whereby the fastener members will finally become formed of a number of successive separate elements.

A fastener according to my invention is quite easily disposed on the belt ends, since each member thereof forms a unit wherein the successive elements are effectively retained at the proper distance apart. The holes in the belt for passage of the securing rivets or the like may therefore be punched or pierced without any guide. It is besides possible to use pointed rivets which may be directly driven into the belt, thus dispensing with any previous punching or piercing operation. The transverse flexibility of the belt is not materially impaired, since the bridge portions between the successive elements are easily bent and moreover break rapidly in use. The fastener is particularly resistant against shocks from lateral obstructions, which are the most frequent cause of damage for conveyor belt fasteners, owing to the presence of the re-inforced end elements. And these re-inforced elements, even if they are of relatively great length, do not materially impair the transverse flexibility of the fastener since in practice a conveyor belt is only curved in its central portion.

My invention also concerns a hinged fastener for conveyor belt wherein the upper jaw of each U-shaped member of the fastener is formed with a downwardly directed shoulder portion adjacent the bent end of the said member in the unrecessed parts thereof, whereby the vertical thickness of these unrecessed parts is reduced with respect to the remainder of the member, while the recessed parts of the bent end are formed with longitudinal extensions substantially situated in the horizontal plane of the upper jaw of the said member to overlap the opposed unrecessed parts of the bent end of the other member. It will be appreciated that with such an arrangement the material carried by the belt is prevented from falling through the spaces corresponding to the unavoidable clearances left between the intermeshing parts of the members forming the fastener. The extensions may be quite separate from the adjacent unrecessed parts of the bent end of each member, or they may be connected therewith by vertically extending lateral flanges. For instance the unrecessed parts may be embossed to provide a depression between two successive extensions, such depression forming the shoulder portion and the adjacent flanges.

In my improved fastener the cross section of the bent end of each member is preferably not perfectly cylindrical, but comprises substantially in the zone of this cross-section farthest from the jaws of the member a substantially flat zone, which may even have a radius of curvature opposed to the radius of the hinge pin, the end face of the bent end then being concave. It is common practice in the shops, collieries, mines and the like wherein conveyor belts are operated, to secure on a given belt a fastener adapted to be normally secured on a belt of greater thickness, for instance because a fastener corresponding to the thickness of the belt to be repaired is not readily available. In such a case the clamping of each U-shaped member of the fastener on the belt of reduced thickness causes further bending of the member at the point of the already bent end thereof farthest from the jaws, whereby the space available for passage of the hinge pin becomes longitudinally elongated and only admits a hinge pin of reduced diameter. Considering that a hinge pin wears out rapidly, it will be appreciated that a marked reduction of the diameter of this pin is not desirable. By providing a substantially flat zone at the extreme end of the cross-section of the bent end, this longitudinal elongation of the space available for the hinge pin is considerably reduced.

While the re-inforcement of the ends of the fastener materially decreases the risk of the fastener being damaged by shocks from lateral obstructions, it has no effect whatever on damages from solid bodies sliding on the belt. This may be obviated by bevelling the transverse edges of the U-shaped members in such a manner that any possible obstruction may slide on the said edges without any tendency to raise the latter. It is also of advantage to cut obliquely the outer edges of the fastener. In a modification the transverse edges, instead of being bevelled, may be curved along a transverse axis to form gutters opening towards the belt, with the free edge of the gutter lying flat against the belt or even slightly projecting into the latter.

The recessed parts of the bent end of each member are preferably flaring outwardly in order to facilitate interengagement of both members without having to provide a too wide clearance. This feature of my improved fastener is of particular advantage when re-mounting a belt which has already been in operation during a rather long time, since the fastener has then undergone substantial deformations which have affected the regular spacing of the recessed and unrecessed parts thereof.

As above explained, my improved fastener may be directly secured on the belt ends by means of pointed rivets which are driven into the belt by hammering or otherwise, without any previous punching operation. The ends of these rivets are preferably of pyramidal form. While rivets with conical ends may perfectly pierce a belt, their manufacture requires a grinding operation which is relatively slow and therefore expensive. A pyramidal end may be obtained by cutting and requires less time and labour.

In the annexed drawings:

Fig. 1 is a partial plan view showing one lateral end of a hinged fastener according to my invention.

Fig. 2 shows one of the two members thereof supposedly separated from the other one.

Fig. 3 is a bottom plan view of the member illustrated in Fig. 2.

Fig. 4 is a large scale section taken along line IV—IV of Fig. 1.

Fig. 5 is a partial perspective view of one of the members of the fastener illustrated in Fig. 4.

Fig. 6 is a view similar to Fig. 5 showing a somewhat modified construction.

Fig. 7 is a partial section diagrammatically showing that a fastener as illustrated in Fig. 1 is not liable to be damaged by an obstruction.

Fig. 8 is a section similar to Fig. 7 illustrating a modification in the edges of the members forming the fastener.

Fig. 9 is a large scale section similar to Fig. 4 illustrating a modification of my improved fastener.

Fig. 10 is a sectional view similar to Fig. 9, but showing the fastener clamped on a belt of reduced thickness.

Fig. 11 is a perspective view illustrating a pointed rivet adapted to be directly driven into the belt ends.

The fastener illustrated in Figs. 1 to 5 is adapted to be fixed on the ends 1 (Fig. 4) of a conveyor belt of large width which runs with its edges raised with respect to the central portion thereof to form a trough supporting the material handled (coal, for instance), while the end pulleys or drums are cylindrical or substantially cylindrical. Such an operation requires a high transverse flexibility and the fastener should not impair same. The fastener is of the hinged type and it comprises two halves which fit together and which are articulated with each other by means of a length 2 of steel cable forming a flexible hinge pin.

Each half is formed of a U-shaped member 3 adapted to be fitted on the corresponding belt end, the latter being clamped between the two flanges or jaws of member 3. The upper jaw, illustrated in Figs. 1 and 2, extends continuously transversely of the belt, while the lower jaw is discontinuous, as illustrated in Fig. 3, and is formed of a succession of elements. Moreover the upper jaw is formed with lines of depression $3l$ extending longitudinally of the belt above the spaces which separate the successive elements of the lower jaw to cause breakage of the member after some time of use.

The end of each member which projects beyond the end of the belt comprises alternately unrecessd parts which surround the articulation pin 2, as indicated at $3a$, $3b$, $3c$, $3d$ in Fig. 4, and recessed parts which do not surround this pin to provide spaces to receive the unrecessed pin surrounding parts of the other member 3, the two members being thus in mutual interengagement. In Fig. 4 each unrecessed part surrounding the articulation pin comprises in succession, starting from the upper flange or jaw of the right-hand member 3, a substantially vertical downwardly directed shoulder portion $3a$, a substantially horizontal portion $3b$ which projects in front of portion $3a$ and above the hinge pin 2, a substantially vertical portion $3c$ extending downwardly in front of pin 2 in the form of a substantially flat zone and a horizontal lower portion $3d$ extending rearwardly in the same horizontal plane as the lower jaw of the U-shaped member 3. The height of the free space provided between portions $3b$ and $3d$ is substantially equal to or slightly greater than the diameter of pin 2. In the lower and upper jaws there has been cut a number of tongues, respectively $3s$ and $3t$, which have been turned respectively upwardly and downwardly to form abutments or stops to limit engagement of the end 1 of the belt into the member under consideration. Tongues $3s$ and $3t$ are disposed as close as possible to the hinge pin 2, the distance between the belt end and pin 2 being kept to the minimum required to permit the two halves 3 of the fastener to rotate with respect to each other through a small angle when the corresponding part of the belt passes on the end pulleys, without forming a "hard point" in the drive.

It should be noted that the vertical portion $3a$ might be so disposed as to form of itself an upper abutment or stop for the belt end, which would dispense with the upper tongues $3t$. As to the lower tongues $3s$, in practice it frequently occurs that the belt is of reduced thickness with respect to the distance apart of the two jaws of members 3 and that consequently it may become engaged beyond shoulder portions $3s$. It is therefore safer to provide tongues $3s$ in the lower jaw of members 3 even when shoulder portions $3a$ are also adapted to form abutments.

Each recessed part of each member 3 which does not surround the hinge pin 2 comprises an upper horizontal extension $3f$ which passes above pin 2 and stops short of the facing shoulder portion $3a$ of the other member 3 to overlap the horizontal portion $3b$ of the latter. Each extension $3f$ is connected with the adjacent portions $3b$ by lateral flanges $3g$ as indicated in Fig. 5, the said portions $3b$ thus forming a sort of depression which may be obtained by punching. Fig. 6 shows a modification wherein extensions $3f$ are wholly separated from portions $3b$.

It will be appreciated that a fastener according to Figs. 1 to 5 or 6 will not permit passage of pulverulent material, for instance of coal dust, the width $a$ of the free space left between extension $3f$ and shoulder portion $3a$ being sufficiently small for this purpose. This width of course increases as the fastener wears out, or when there is employed a hinge pin of too small diameter, but the dust then accumulates on the horizontal portion 3b and forms thereon a mass A which stops the passage. Also owing to the presence of the vertical portion or flat zone 3c, when the fastener is clamped on a belt of reduced thickness the bending which results therefrom primarily affects the said portion which becomes arcuate in transverse section. But its radius of curvature never falls in practice below the radius of the cross-section of the hinge pin which may thus be engaged through the fastener.

The transverse end edges of members 3 are preferably bevelled, as indicated at 3h in Fig. 7, whereby when they meet an obstruction such as B the latter may slide on the bevelled portion without raising the edges and damaging the fastener. In the modification of Fig. 8 the end edges are curved along a transverse axis, each forming a gutter 3i opening inwardly, i.e. towards the belt, with the free edge of the gutter lying flat against the belt or even projecting slightly into the soft material of the latter. Here also when the fastener meets an obstruction, the latter will slide on the arcuate outer wall of gutter 3i without materially damaging the corresponding member 3. All the other transverse edges of the fastener are similarly bevelled or curved, as indicated in Fig. 4 for the free edge of extension 3f.

In the modification of Fig. 9 the foremost portion 3c of the part of each member 3 which surrounds the articulation pin 2 is slightly curved outwardly of the latter, i.e. it is of outer concave form and of inner convex form. The portion 3b disposed above pin 2 is not horizontal, but extends downwardly, the height of shoulder portion 3a being considerably reduced. With such an arrangement when the fastener is clamped on a belt of considerably reduced thickness, the deformation which results therefrom still leaves a sufficient space for passage of a normal hinge pin of substantial diameter, as clearly shown in Fig. 10. By comparing Figs. 9 and 10 it will be appreciated that when the right hand member 3 has been clamped on a belt 1 of reduced thickness the deformation undergone has caused bending of portion or zone 3c substantially about the axis of pin 2, whereby the said portion or zone now assumes an approximately rectilinear shape, while portion 3b has become horizontal. In spite of the considerable difference in thickness of the belts of Figs. 9 and 10, there is left in both cases a passage for pin 2. This avoids having to provide a large number of types of fasteners for conveyor belts of different thickness.

It will moreover be remarked that in the embodiment of Fig. 9 member 3 only comprises lower tongues or abutments 3u which are curved substantially co-axially to pin 2, whereby their ends may be disposed close to the latter. The belt end may thus be brought close to the hinge pin, whereby the total longitudinal length of the fastener may be reduced, which further facilitates passage on the end pulleys of the belt.

The lateral ends of members 3 are cut obliquely, as indicated at 3f and 3k in Figs. 1 to 3 to avoid any sharp angle along the edges of the belt. It will be appreciated that with such an arrangement, if the belt slides against a solid body, the latter is practically not liable to damage the fastener.

The lateral ends of members 3 are preferably reinforced with respect to the intermediate part thereof. In the embodiment illustrated in Figs. 1 to 3 this is obtained by making of greater length the end elements of each member 3, as indicated at C, with respect to the elements of the intermediate zone D. Such an increase in the length of the end elements does not affect the transverse flexibility required from the belt because in practice a conveyor belt is curved in U-shape, i.e. only in the central portion of its cross-section, the edges substantially remaining rectilinear. It will also be appreciated that in zone C the pitch of succession of unrecessed parts surrounding the hinge pin and of recessed parts which do not surround the latter is somewhat smaller than in zone D. In other words members 3 are attached to pin 2 and to each other in zone C at somewhat closer intervals than in zone D, which may be considered as a further reinforcement of the fastener.

Re-inforcement of the ends of the fastener may also be obtained by making such ends of a metal of greater thickness, or by disposing the rivets closer to each other.

As indicated in Figs. 2 and 3 the recessed parts of each member 3 are preferably flaring outwardly, their lateral edges being slightly oblique with respect to the longitudinal axis of the belt. This arrangement facilitates the engagement of members 3 with each other when mounting the fastener, while in the known constructions, wherein the lateral edges of the recessed parts are parallel to the axis of the belt, this mutual engagement is often quite difficult, for instance when the fastener has already been in use and has undergone more or less substantial deformations. It would of course be possible to obtain an easy engagement by providing sufficient lateral clearance between the interengaged recessed and unrecessed parts of members 3, but this would impair the tightness of the fastener against pulverulent material.

Fig. 11 illustrates a pointed rivet for securing my fastener on the ends of a conventional conveyor belt. Pointed rivets have hitherto been formed with a conical end, which requires a grinding operation of the normally cylindrical end. The rivet shown in Fig. 11 has a pyramidal end which is easily obtained by cutting the cylindrical end along three or four planes appropriately disposed, whereby the cost of manufacture is substantially reduced.

As already mentioned the lower jaw of each member 3 is discontinuous, being longitudinally cut at regular intervals in the middle of each recessed part of the bent end of the member under consideration in the intermediate zone D of the fastener, in such a manner that such member may be considered as a succession of fastener elements connected with each other on the upper jaw of the member by relatively flexible bridge portions. And in the axis of each bridge portion there is cut a longitudinal groove or depression 3l which forms a line of lesser mechanical strength. When the fastener has been adapted on a given belt, the bridge portions are submitted to repeated bending and unbending and they break rapidly, whereby the fastener is then formed of separate elements which do not reduce the transverse flexibility of the belt. It will be appreciated that with such an arrangement my improved fastener at first forms an inextensible unit which may easily be adapted on the ends of the belt without any guide or the like, while after a relatively short time of operation it becomes formed of separate elements without any transverse rigidity.

I claim:

1. A hinge fastener for conveyor belts and the like comprising two generally U-shaped sheet metal members adapted to fit on the opposed ends of the belt, substantially along the whole width thereof, each member having an upper horizontal jaw and a lower horizontal jaw connected by a bent end and being recessed at intervals in its bent end and adjacent same to provide spaces to receive the unrecessed parts of the other member in intermeshing engagement, each unrecessed part of each member being formed of a substantially vertical shoulder portion extending downwardly from said upper jaw on a smaller distance than the distance apart of said upper and lower jaws and a U-shaped portion disposed in front of said shoulder portion to connect the lower edge of same with said lower jaw, and each recessed part of each member being formed with an integral substantially rigid extension substantially situated in the plane of said upper jaw to overlap the U-shaped portion of the unrecessed part of the other member which is engaged into the last-named recessed part of the first member, said extension terminating short of the shoulder portion of the last-named unrecessed part of the other member; and a hinge pin rotatably engaged through the intermeshing bent ends of both members.

2. In a hinge fastener as claimed in claim 1, each member being formed with flange portions substantially disposed in successive longitudinal vertical planes to connect the side edges of each extension with the vertical side edges of each adjacent shoulder portions and with the upper side edges of the adjacent U-shaped portions.

3. In a hinge fastener as claimed in claim 1, the cross-section of each U-shaped portion of each member comprising in the zone of said portion farthest from the jaws of said member a substantially flat vertical zone.

References Cited in the file of this patent

UNITED STATES PATENTS

| | | |
|---|---|---|
| 430,668 | Morrall | June 24, 1890 |
| 472,052 | Holdsworth | Apr. 5, 1892 |
| 1,476,084 | Kiefer | Dec. 4, 1923 |
| 1,506,489 | Kiefer | Aug. 26, 1924 |
| 1,564,798 | Sturtevant | Dec. 8, 1925 |
| 1,595,057 | Irwin | Aug. 3, 1926 |
| 1,673,378 | Sunday | June 12, 1928 |
| 2,031,936 | Cuno | Feb. 25, 1936 |
| 2,196,144 | Eckler | Apr. 2, 1940 |
| 2,238,463 | Dubilier | Apr. 15, 1941 |
| 2,451,454 | Watter | Oct. 12, 1948 |

FOREIGN PATENTS

| | | |
|---|---|---|
| 430,056 | Great Britain | June 12, 1935 |
| 487,632 | Great Britain | June 23, 1938 |
| 612,565 | Great Britain | Nov. 15, 1948 |
| 667,519 | Great Britain | Mar. 5, 1952 |
| 708,461 | Great Britain | May 5, 1954 |
| 921,215 | France | Jan. 10, 1947 |
| 958,296 | France | Sept. 12, 1949 |
| 1,065,983 | France | Jan. 13, 1954 |